(12) United States Patent
Goldberg et al.

(10) Patent No.: US 8,537,487 B2
(45) Date of Patent: Sep. 17, 2013

(54) MAGNETIC STORAGE DEVICE WITH CHIRPED WRITE HEAD DEGAUSSING WAVEFORM

(75) Inventors: Jason S. Goldberg, Saint Paul, MN (US); Boris Livshitz, Eagan, MN (US)

(73) Assignee: LSI Corporation, San Jose, CA (US)

( * ) Notice: Subject to any disclaimer, the term of this patent is extended or adjusted under 35 U.S.C. 154(b) by 231 days.

(21) Appl. No.: 13/186,445

(22) Filed: Jul. 19, 2011

(65) Prior Publication Data

US 2013/0021691 A1   Jan. 24, 2013

(51) Int. Cl.
*G11B 5/03* (2006.01)
*G11B 5/09* (2006.01)
*G11B 5/02* (2006.01)

(52) U.S. Cl.
USPC ................................. 360/66; 360/46; 360/68

(58) Field of Classification Search
None
See application file for complete search history.

(56) References Cited

U.S. PATENT DOCUMENTS

| | | | |
|---|---|---|---|
| 7,372,653 B2 | 5/2008 | Suzuki et al. | |
| 7,787,211 B2 | 8/2010 | Kim et al. | |
| 2005/0243457 A1 | 11/2005 | Akamatsu et al. | |
| 2006/0176597 A1 | 8/2006 | Ngo et al. | |
| 2008/0316669 A1 | 12/2008 | May | |
| 2012/0105992 A1* | 5/2012 | Dina et al. | 360/27 |

* cited by examiner

*Primary Examiner* — Regina N Holder
(74) *Attorney, Agent, or Firm* — Otterstedt, Ellenbogen & Kammer, LLP (57) ABSTRACT

A circuit for use with a memory storage device including a magnetic storage medium and a write head operative to subject the magnetic storage medium to a magnetic field in response to an application of current to the write head, includes a write circuit operative to generate a write current supplied to the write head. The write current is characterized by a current waveform that reverses polarity in accordance with data to be stored on the magnetic medium. The circuit for use with the memory storage device further includes a degauss circuit operative to generate a degaussing current supplied to the write head. The degaussing current is characterized by a current waveform that oscillates between opposite polarities with an amplitude and a frequency that change over time.

20 Claims, 7 Drawing Sheets

MAGNETIC STORAGE DEVICE WITH CHIRPED WRITE HEAD DEGAUSSING WAVEFORM

FIELD OF THE INVENTION

The present invention relates generally to electrical and electronic devices and circuits, and more particularly relates to magnetic storage apparatus and methods therefor.

BACKGROUND OF THE INVENTION

Figure 1:
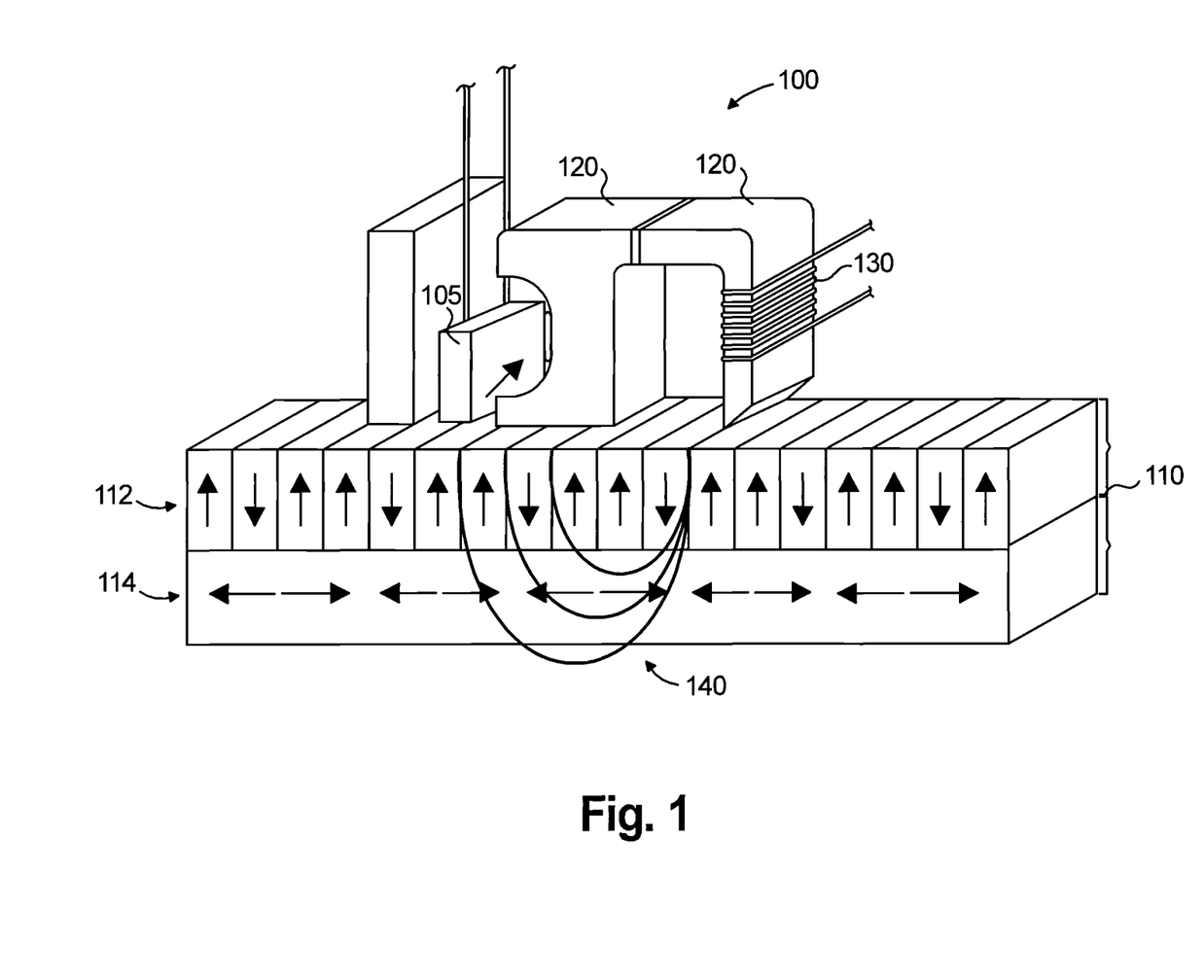
FIG. 1 shows a perspective view of a conventional HDD head.

Modern magnetic storage devices, including, for example, hard disk drives (HDDs), may use various forms of write heads. FIG. 1 shows a typical inductive write head 100 along with a magnetoresistive read head 105 and a magnetic disk 110. The magnetic disk comprises a recording layer 112 and a magnetically soft underlayer 114. The inductive write head 100 includes two ferrite cores 120. One of the ferrite cores 120 is partially surrounded by a coil 130 to produce an electromagnet. Applying current to the coil 130 generates a strong magnetic field, which forms a fringing field 140 that extends out of the two ferrite cores 120 into the magnetic disk 110 that is moving beneath it. Writing logical data on the magnetic disk 110 involves reversing the polarity of the current through the coil 130 (i.e., the write current) in response to the logical data being recorded to create a pattern of two oppositely-oriented remanent states on the magnetic disk 110 that represent the logical data. The remanent states may be vertically aligned when utilizing perpendicular recording (as shown) or may be horizontally aligned when utilizing longitudinal recording. Under the "non-return-to-zero, inverted" (NRZI) coding protocol, for example, a logical "1" is represented by a change in remanent states from one orientation to the other.

Unfortunately, storing data in this manner is not without issues. When the write current of an inductive write head is switched off, it takes time for the write head to relax back to its net-zero magnetization state. During this relaxation process, residual magnetization from the write head can erase or degrade prewritten data as the head continues to move over the magnetic disk. This failure mode is known as erase-after-write (EAW) or pole tip remanence. When EAW events occur, the effects are often catastrophic. The erased or degraded data may be user data or even the fixed servo sectors that are used by the HDD in determining the radial position of the write head.

One method for mitigating EAW is to apply a degaussing current waveform (DCW) to the write head immediately after performing a write operation. The typical DCW is characterized by a write current that oscillates between opposite polarities at a fixed frequency but with a decreasing amplitude over time. Such a DCW has the effect of switching the write head magnetization polarity in one direction and then in the other at a fixed frequency while gradually decreasing the magnitude of these oscillations so that the write head ultimately ends up in a relaxed, net-zero magnetization state. Nevertheless, such known DCWs are not always effective. There are still many write head designs where conventional DCWs are not entirely effectual in achieving a net-zero magnetization state. EAW incidents therefore persist.

SUMMARY OF THE INVENTION

The present invention, in illustrative embodiments thereof, relates to techniques for beneficially mitigating EAW failure modes which can occur during the process of storing data on a magnetic medium (e.g., HDD), among other important advantages. In one aspect, the present invention provides improved methods and apparatus for degaussing write heads in magnetic storage devices, particularly HDDs.

In accordance with one aspect of the invention, a circuit for use with a memory storage device including a magnetic storage medium and a write head operative to subject the magnetic storage medium to a magnetic field in response to an application of current to the write head, includes a write circuit operative to generate a write current supplied to the write head. The write current is characterized by a current waveform that reverses polarity in accordance with data to be stored on the magnetic medium. The circuit further includes a degauss circuit operative to generate a degaussing current supplied to the write head. The degaussing current is characterized by a current waveform that oscillates between opposite polarities with both an amplitude and a frequency that change over time.

In accordance with another aspect of the invention, a memory storage device for storing data comprises a magnetic medium, a write head, writing circuitry, and degaussing circuitry. The write head is operative to expose the magnetic disk to a magnetic field in response to the application of current to the write head. The writing circuitry is operative to apply a write current to the write head, the write current characterized by a current waveform that reverses polarity in accordance with the data to be stored. Lastly, the degaussing circuitry is operative to apply a degaussing current to the write head, the degaussing current characterized by a current waveform that oscillates between opposite polarities with both an amplitude that changes over time and a frequency that changes over time.

In accordance with one of the above-identified embodiments of the invention, a hard disk drive preferably utilizes a DCW with both a linearly decreasing amplitude over time and a linearly decreasing frequency over time. The DCW may be formed by circuitry comprising a voltage controlled oscillator in combination with two voltage ramp generators.

Advantageously, DCWs formed in accordance with aspects of the invention provide shorter degaussing times compared to prior art methods, and are therefore more effective in degaussing "marginal" write heads that have displayed trouble being degaussed by conventional techniques.

These and other features, objects and advantages of the present invention will become apparent from the following detailed description of illustrative embodiments thereof, which is to be read in connection with the accompanying drawings.

BRIEF DESCRIPTION OF THE DRAWINGS

The following drawings are presented by way of example only and without limitation, wherein like reference numerals indicate corresponding elements throughout the several views, and wherein.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION OF PREFERRED EMBODIMENTS

The present invention will be described herein with reference to illustrative embodiments of an HDD. It is to be understood, however, that the invention is not limited to the embodiments shown and described herein. Rather, the invention is more generally applicable to techniques for beneficially eliminating, or at least attenuating, EAW failure modes which can occur during the process of storing data on a magnetic medium (e.g., HDD), among other important advantages. Moreover, it will become apparent to those skilled in the art given the teachings herein that numerous modifications can be made to the embodiments shown that are within the scope of the present invention. That is, no limitations with respect to the specific embodiments described herein are intended or should be inferred. For this reason, numerous modifications can be made to these embodiments and the results will still come within the scope of the invention. No limitations with respect to the specific embodiments described herein are intended or should be inferred.

For purposes of this description, the term "waveform" is intended to broadly describe, in a graphical representation, a manner in which a quantity (or quantities) varies relative to another quantity, preferably time.

Figure 2:
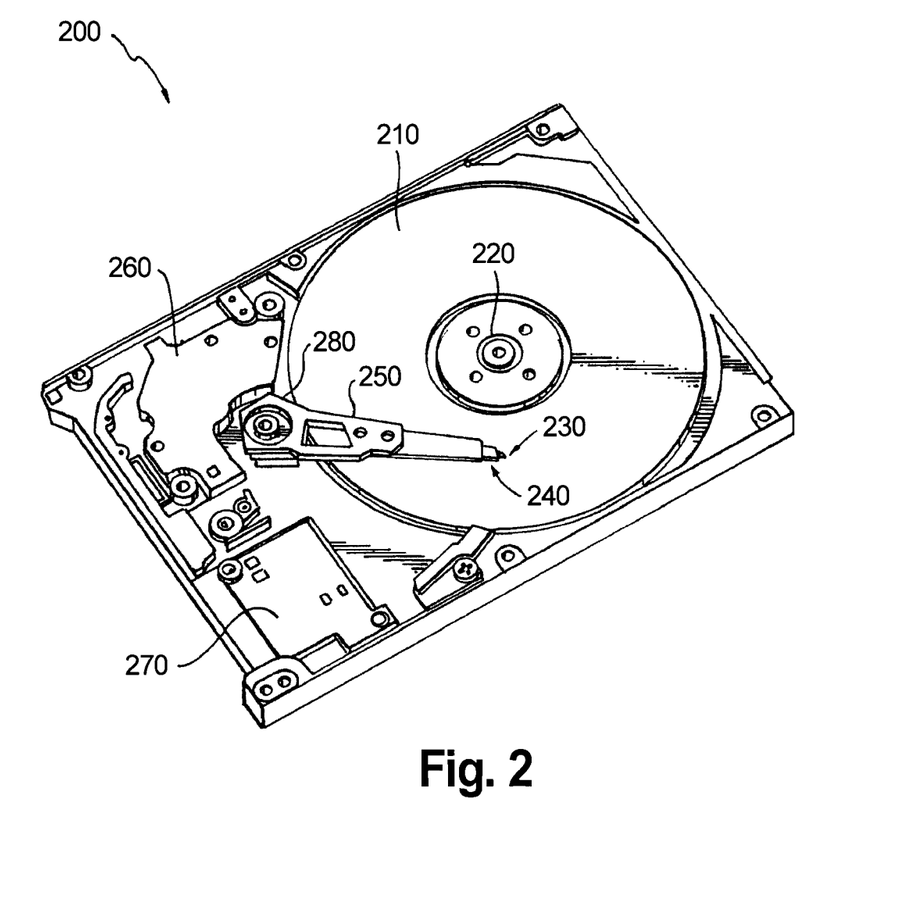
FIG. 2 shows a perspective view of at least a portion of an exemplary HDD, according to an embodiment of the present invention.

FIG. 2 shows a perspective view of at least a portion of an exemplary HDD 200, according to an embodiment of the present invention. The HDD 200 comprises a conventional magnetic disk 210, typically formed of rigid aluminum or glass (often referred to as a platter), which is coated on its surface with a magnetic medium adapted for storing data thereon. The magnetic disk 210 is connected to a spindle 220 driven by a conventional spindle motor (not shown) that is capable of spinning the magnetic disk 210 at high speed (e.g., about 5400 revolutions per minute (rpm) or higher). A conventional inductive write head 230 and a conventional read head 240 are mounted at the distal end of a positioning arm 250. The write head 230 acts to write encoded data to the magnetic surface of the magnetic disk 210, while the read head 240 acts to read previously stored data. The positioning arm 250 is precisely positioned over the magnetic disk 210 by a conventional electromechanical actuator 260. Control circuitry 270, only partially shown, serves to control the components of the HDD 200, to accomplish signal processing tasks, and to communicate data between the HDD 200 and whatever data processing system the HDD 200 is servicing (i.e., the host). A preamp 280 (i.e., preamplifier) acts to amplify signals going to the write head 230 and coming from the read head 240, and to provide a degaussing functionality (described in further detail below).

While the illustrative HDD 200 as shown herein comprises only a single magnetic disk 210, this is largely for ease of explanation and aspects of the invention can readily be applied to an HDD comprising several magnetic disks with their associated read and write heads. Modern HDDs frequently utilize more than one magnetic disk in order to provide greater storage capacity and faster access speeds. The multiple magnetic disks are usually attached to a single spindle so that they rotate at the same speed and are actuated by a single spindle motor. HDDs are employed many applications including in data center systems with large numbers of HDDs in banks for storage of massive amounts of data. HDDs including the invention can be employed in such systems.

Figure 3:
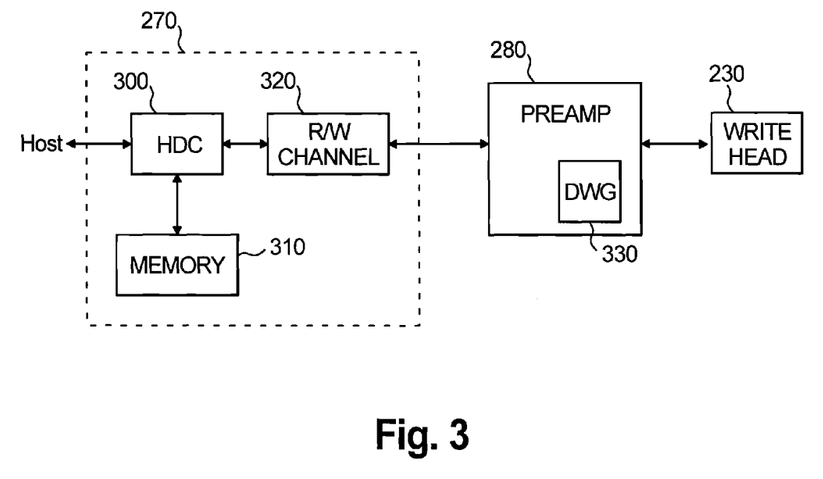
FIG. 3 is a block diagram depicting at least a portion of an exemplary circuit which may reside within the illustrative HDD shown in FIG. 2, according to an embodiment of the present invention.

FIG. 3 is a simplified block diagram depicting at least a portion of exemplary circuitry which may reside within the illustrative HDD 200 shown in FIG. 2, according to an embodiment of the present invention. Specifically, FIG. 3 shows several circuit elements within the HDD 200 associated with writing data to the magnetic disk 210 and degaussing the HDD's write head 230. These circuit elements preferably include a hard drive controller (HDC) 300, a memory 310, and a read-write channel (r/w channel) 320, each of which is located within the control circuitry 270. In addition, a degaussing waveform generator (DWG) 330 is preferably included within the preamp 280.

A write event is initiated by a host transmitting a write command to the HDC 300 and providing the data that is to be stored on the magnetic disk 210 (see, also, FIG. 2). Once so initiated, the HDC 300 preferably responds by interfacing with the host and with the r/w channel 320, buffering the data via the memory 310, causing the actuator 260 to properly position the write head 230 on the magnetic disk 210 (FIG. 2), causing the spindle motor to spin the magnetic disk 210, performing error correction, and performing various other functions. The data to be written is then passed from the HDC 300 to the r/w channel 320 and ultimately to the preamp 280, which is operative to convert the data into a write current for the write head 230. The write current is characterized by a current waveform that reverses polarity in accordance with the data being stored. After this, the write current is passed through the preamp 280 and applied to the coils (e.g., 140 in FIG. 1) in the write head 230 itself.

Notably, some of the above described elements are largely conventional, although the invention is not limited to the use of conventional elements. Additional information about these conventional elements, and HDDs in general, may be found in, for example, A. A. Mamun et al., *Hard Disk Drive: Mechatronics and Control*, CRC Press, 2007, which is hereby incorporated by reference herein. In contrast, the DWG 330 and the degaussing current waveform (DCW) it is designed to produce are entirely novel.

Figure 4A:
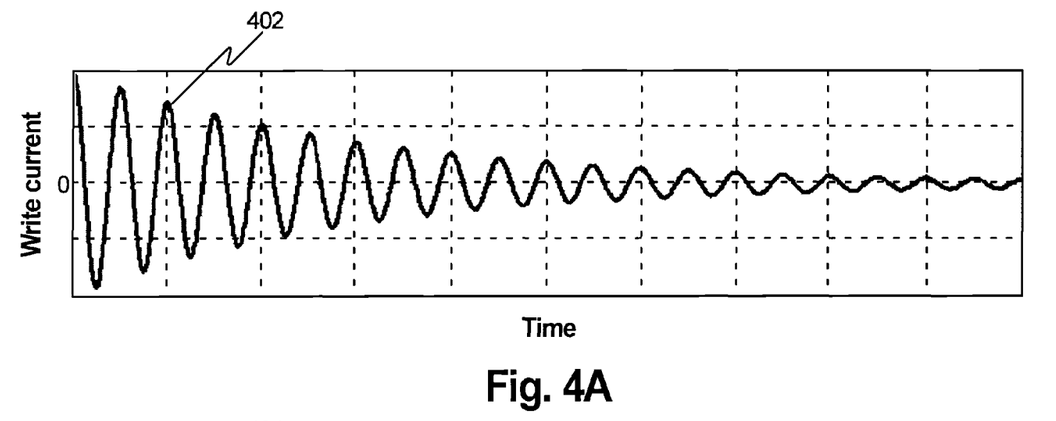
FIG. 4A shows an exemplary DCW having a decreasing amplitude over time and a fixed frequency.
Figure 4B:
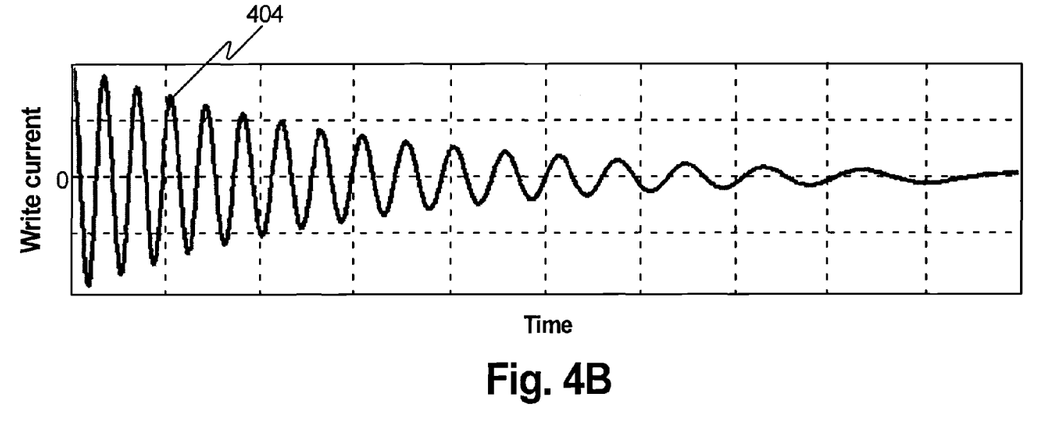
FIG. 4B shows an exemplary DCW having both a decreasing amplitude over time and a decreasing frequency over time, according to aspects of the present invention.

In accordance with aspects of the invention, the DWG 330 in the HDD 200 is operative to apply a "down-chirped" DCW to the write head 230 immediately after each write operation in order to return the write head 230 to a net-zero magnetization state before there is the opportunity for an EAW event. FIGS. 4A and 4B show two current waveforms that help to set forth the unique aspects of the down-chirped DCW generated by the DWG 330. Specifically, for comparison purposes only, FIG. 4A shows an exemplary DCW having a decreasing amplitude over time and having a fixed frequency, and FIG. 4B shows an exemplary DCW having both a decreasing amplitude over time and a decreasing frequency over time, according to aspects of the invention. Current waveform 402 is characterized by a current waveform that oscillates between opposite polarities with a decreasing amplitude over time and a fixed frequency. Current waveform 404, corresponding to an embodiment of the unique down-chirped DCW produced by the DWG 330, is characterized by a current waveform that oscillates between opposite polarities with both a decreasing amplitude over time and with a decreasing frequency over time. For clarity, it is the decreasing frequency over time in the DCW produced by the DWG 330 to which the term "down-chirped" refers. As will detailed below, the frequency may also be made to increase, thereby creating an "up-chirped" DCW.

While the DCWs shown in FIGS. 4A and 4B are smooth, they may optionally be executed with current overshoots and/or undershoots when implemented in an HDD. Such overshoots and undershoots have been found to be effective in helping to rapidly switch the write head magnetization when writing data in HDDs. Current overshoots and undershoots may be of variable amplitude and duration. One skilled in the art will recognize how to include and remove such features, and DCWs both with and without these features would come within the scope of the invention.

For purposes of achieving a net-zero magnetization state in the write head 230 (FIG. 2), a down-chirped DCW like that shown in current waveform 404 of FIG. 4 is superior to a fixed-frequency DCW like that shown in current waveform 402. An inductive write head is a non-linear element that has a response that depends on how hard it is being driven. It has been observed that effectively reversing the magnetic polarity of such a write head at high frequency is best accomplished with a relatively high write head current, thereby driving the write head into saturation faster than would occur with less current. The contrapositive has also been observed. Specifically, switching a write head with a low write head current is best accomplished with a relatively low frequency. The down-chirped DCW applied by the DWG 330 leverages these observed trends.

More particularly, as the amplitude of the write head current is decreased over time, the frequency is also made to decrease. This novel technique advantageously allows for a more complete degauss versus previous methods. It also allows the degaussing to be effectuated in a shorter period of time. The ideal duration, frequency, and amplitude of the down-chirped DCW is highly dependent on the write head design and write data waveform parameters. When implemented, the degauss duration may, by way of example only and without loss of generality, occur over about 10-40 nanoseconds. Frequency may start at, for example, about 2.5 gigahertz and finish at about 500 megahertz. Finally, amplitude may start at, for example, about 20-60 milliamps and finish at about zero milliamps.

Figure 5:
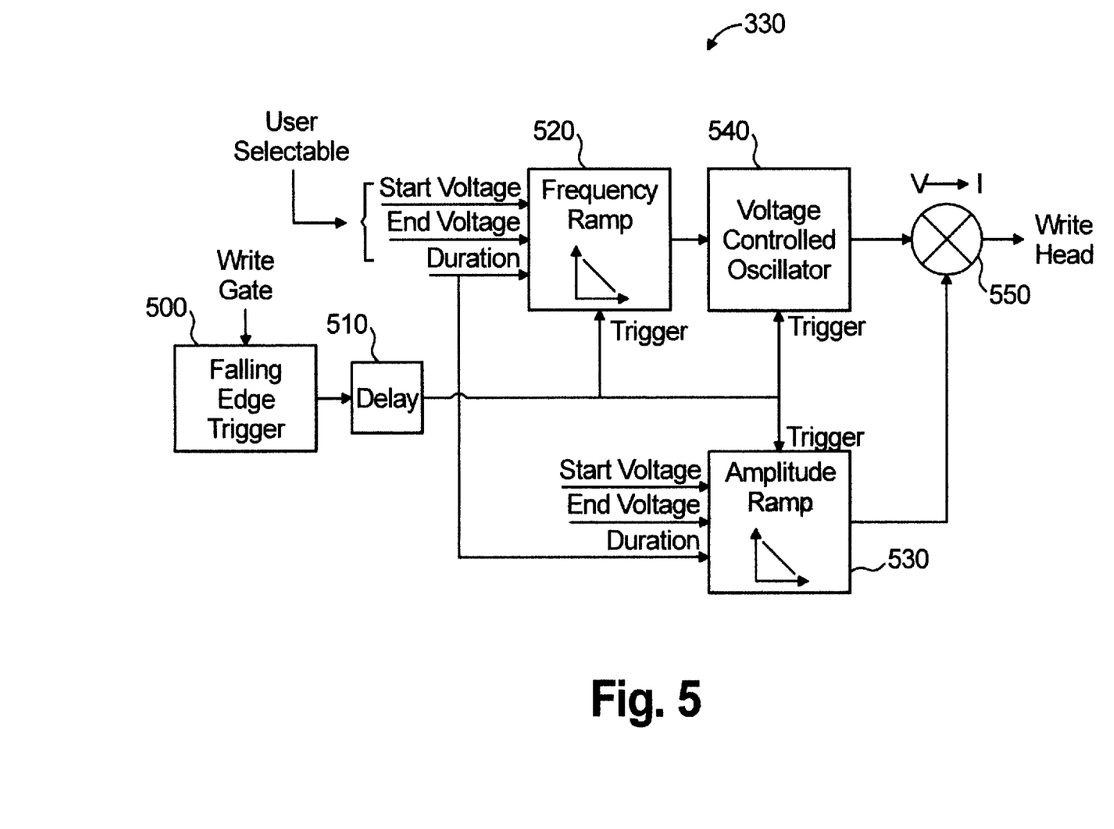
FIG. 5 is a block diagram depicting at least a portion of an exemplary circuit which may reside within the illustrative degaussing waveform generator in the HDD shown in FIG. 2, according to an embodiment of the present invention.
Figure 6:
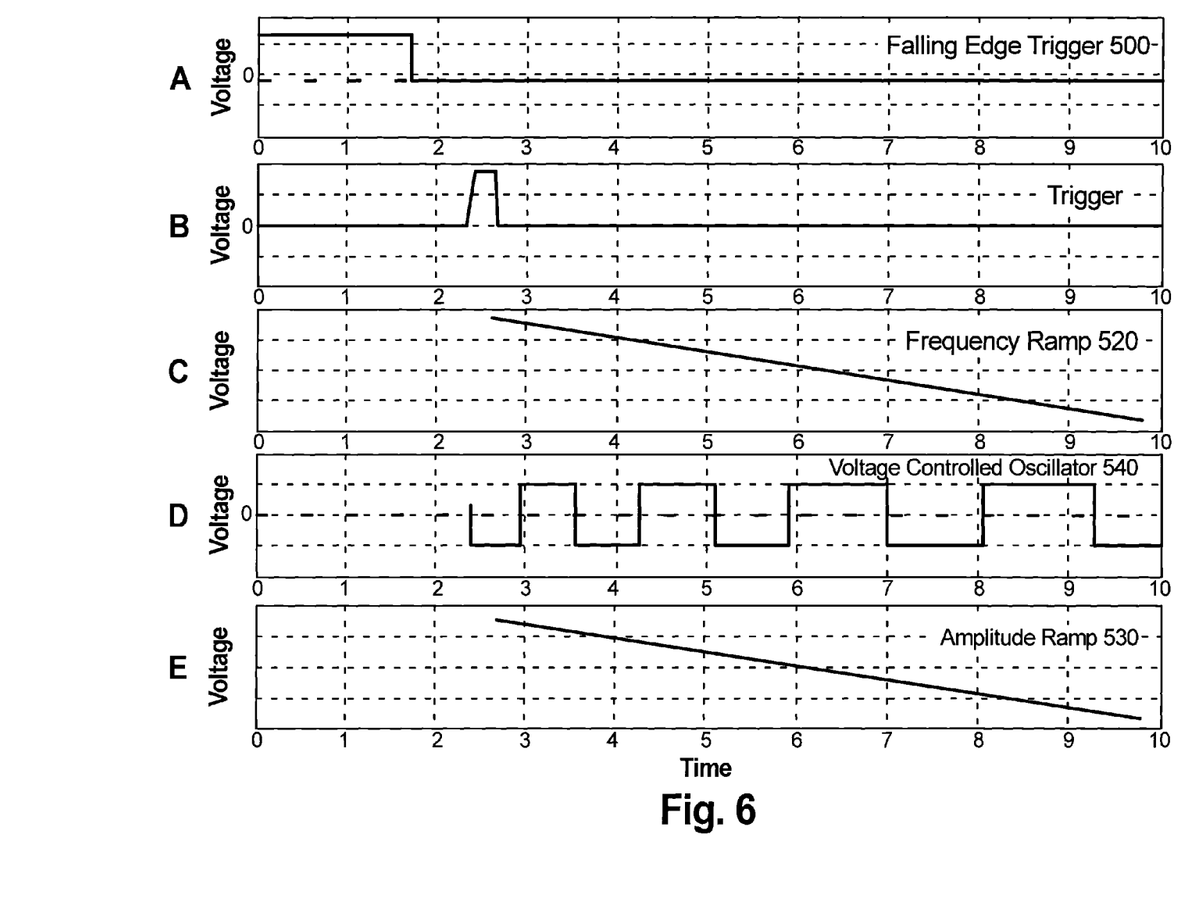
FIG. 6 shows exemplary voltage waveforms corresponding to several elements within the illustrative degaussing waveform generator in the HDD shown in FIG. 2.

FIG. 5 is a block diagram depicting at least a portion of an exemplary circuit which may reside within the illustrative degaussing waveform generator in the HDD shown in FIG. 2, according to an embodiment of the invention. Specifically, FIG. 5 shows elements within the DWG 330 itself. The DWG 330 preferably comprises a falling edge trigger block 500, a delay block 510, a first signal generation block, which may be a frequency ramp block 520, a second signal generation block, which may be an amplitude ramp block 530, a voltage controlled oscillator (VCO) block 540, and a mixer block 550. Illustrative voltage waveforms that may occur within these blocks and that may ultimately produce a down-chirped DCW like current waveform 404 in FIG. 4 are shown in FIG. 6.

An exemplary process of forming the down-chirped DCW is initiated by the falling edge or rising edge of a write gate voltage. In conventional HDDs, the write gate voltage changes polarities when switching from a write mode to a non-write mode. This edge (in this case, a falling edge) is shown in voltage waveform A in FIG. 6.

After detecting the falling edge of the write gate voltage, the falling edge trigger block 500 creates a falling edge trigger pulse having a prescribed pulse width. This falling edge trigger pulse is communicated to the delay block 510 which is operative to add some additional time to the trigger pulse and to generate a delayed trigger pulse, shown in voltage waveform B. The delayed trigger pulse, in turn, is supplied to the frequency ramp block 520, the amplitude ramp block 530, and the VCO block 540. The delay is added to the falling edge trigger pulse to allow the VCO in the VCO block 540 to be started and stabilized.

The VCO block 540 is configured to generate a square wave of varying frequency as determined by a control voltage emanating from the frequency ramp block 520. As is well known by those skilled in the art, a VCO is essentially a voltage-to-frequency converter which is adapted to vary a frequency of an output signal generated by the VCO as a function of a control voltage supplied to the VCO. In response to the delayed trigger pulse, the frequency ramp block 520 creates a linearly decreasing voltage as shown in voltage waveform C. As indicated in FIG. 5, the start voltage, end voltage, and duration parameters for the linearly decreasing voltage may be user selectable, although one or more of these parameters may also be controlled without use input. This decreasing voltage waveform is fed to the control voltage input of the VCO block 540, thereby causing the VCO block 540 to produce voltage waveform D in FIG. 6.

Simultaneously, the delayed trigger pulse causes the amplitude ramp block 530 to also produce a linearly decreasing voltage as shown in voltage waveform E. The start voltage and end voltage (e.g., zero volts) are preferably predetermined. The duration of linearly decreasing voltage generated by amplitude ramp block 530 is preferably the same as that used by the frequency ramp block 520, as indicated by the common connection of the duration control signal between the two blocks.

Lastly, the mixer block 550 combines the square wave output of the VCO block 540 and the output of the amplitude ramp block 530 to produce a waveform characterized by a square wave with both a decreasing amplitude over time and a decreasing frequency over time. The mixer block 550 may also include a voltage-to-current converter which is operative to convert the voltage waveform into a current waveform, which is then applied to the write head 230, although a separate voltage-to-current converter (not explicitly shown) connected with the mixer block 550 may also be employed for this purpose.

Figure 7:
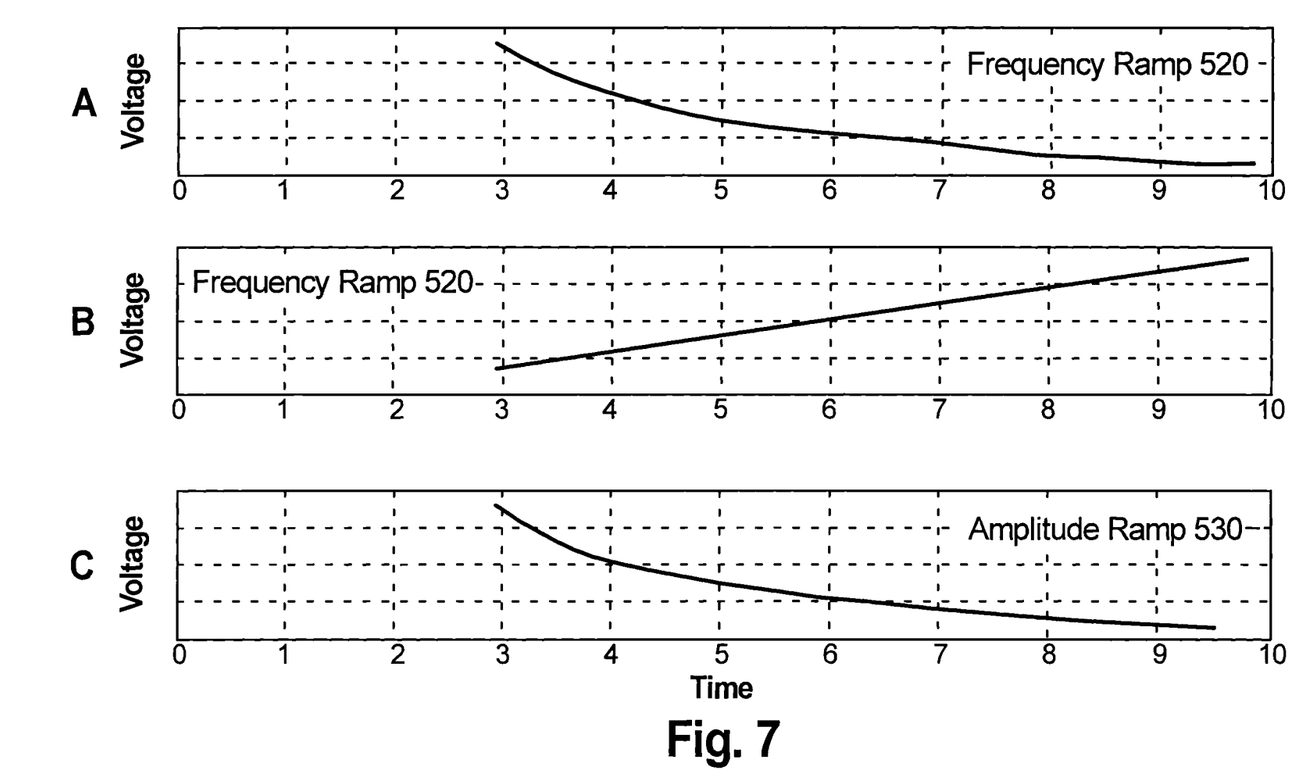
FIG. 7 shows alternative voltage waveforms for use with the illustrative degaussing waveform generator in the HDD shown in FIG. 2.

While the down-chirped DCW generated by the above-described embodiment utilizes a linearly decreasing frequency and amplitude over time, it may be beneficial, depending on the application, to create a DCW with a frequency that increases over time (thereby creating an up-chirped DCW) or one where one or more of the frequency and amplitude profiles are non-linear (e.g., exponential or based on the inverse of a time constant). Advantageously, these changes may be made by simply modifying the voltage waveforms produced by the frequency ramp block 520 and amplitude ramp block 530 to give the desired DCW, as will become apparent to those skilled in the art given the teachings herein. Illustrative voltage waveforms A and B of FIG. 7, for example, show what the voltage output of the frequency ramp block 520 might look like to achieve a non-linearly decreasing frequency and a linearly increasing frequency, respectively. Voltage waveform C of FIG. 7 shows, as another example, what the output voltage of the amplitude ramp block 530 might look like to achieve a non-linearly decreasing amplitude in the resultant DCW.

It should be noted that the several blocks shown in FIGS. 3 and 5 are not intended to represent the physical configuration of the control circuitry 270, the preamp 280, and the DWG 330, but are, instead, intended to merely highlight some of the functional aspects of these elements. Advantageously, once the novel functionality of these elements is understood, they may be implemented by a person having ordinary skill in the circuit design arts using analog circuits, digital circuits, or a combination thereof.

It should again be emphasized that the above-described embodiments of the invention are intended to be illustrative only. Other embodiments may use different forms, types, and/or arrangements of elements for implementing the described functionality. These numerous alternative embodiments within the scope of the appended claims will become apparent to one skilled in the art given the teachings herein. Moreover, all or a portion of the features disclosed herein may be replaced by alternative features serving the same, equivalent, or similar purposes, unless expressly stated otherwise. Thus, unless expressly stated otherwise, each feature disclosed is one example only of a generic series of equivalent or similar features.

At least a portion of the techniques of the present invention may be implemented in one or more integrated circuits. In forming integrated circuits, identical die are typically fabricated in a repeated pattern on a surface of a semiconductor wafer. Each die includes a device described herein, and may include other structures and/or circuits. The individual die are cut or diced from the wafer, then packaged as an integrated circuit. One skilled in the art would know how to dice wafers and package die to produce integrated circuits. Several elements shown in FIGS. 3 and 5, or portions thereof, may, for example, be part of one or more integrated circuits utilizing conventional integrated circuit design and fabrication techniques. These techniques, in addition to being conventional, are also described in several readily available references, including, for example, N. H. E. Weste et al., *Integrated Circuit Design*, Pearson, 2010, which is hereby incorporated by reference herein. Integrated circuits so manufactured are considered part of this invention.

An integrated circuit in accordance with the present invention can be employed in essentially any application and/or electronic system in which data is stored on a magnetic medium (e.g., HDD). Suitable systems for implementing techniques of the invention may include, but are not limited, to personal computers, servers, memory storage devices (e.g., redundant array of inexpensive (or independent) disks (RAID) systems), etc. Systems incorporating such integrated circuits are considered part of this invention. Given the teachings of the invention provided herein, one of ordinary skill in the art will be able to contemplate other implementations and applications of the techniques of the invention.

Although illustrative embodiments of the present invention have been described herein with reference to the accompanying drawings, it is to be understood that the invention is not limited to those precise embodiments, and that various other changes and modifications may be made therein by one skilled in the art without departing from the scope of the appended claims.

What is claimed is:

1. A circuit for use with a memory storage device including a magnetic storage medium and a write head operative to subject the magnetic storage medium to a magnetic field in response to an application of current to the write head, the circuit comprising:
    a write circuit operative to generate a write current supplied to the write head, the write current characterized by a current waveform that reverses polarity in accordance with data to be stored on the magnetic medium; and
    a degauss circuit operative to generate a degaussing current supplied to the write head, the degaussing current characterized by a current waveform that oscillates between opposite polarities with an amplitude that changes over time and a frequency that changes over time, wherein the degauss circuit comprises:
    a first signal generator operative to generate a first control signal as a function of a first set of parameters supplied to the first signal generator;
    a second signal generator operative to generate a second control signal as a function of a second set of parameters supplied to the second signal generator;
    a voltage-controlled oscillator (VCO) operative to generate an output signal having a frequency which varies as a function of the first control signal; and
    a mixer connected with the VCO and second signal generator, the mixer operative to generate the degaussing current having a frequency which varies with a function of the first control signal and having an amplitude which varies as a function of the second control signal.

2. The circuit of claim 1, wherein at least one of the first and second signal generators comprises a voltage ramp generator, at least one of the first set of parameters being user-selectable for controlling one or more characteristics of the first control signal.

3. The circuit of claim 1, wherein the degauss circuit further comprises a trigger circuit operative to receive a write gate signal indicative of a write mode and to generate a trigger signal supplied to the first and second signal generators and to the VCO for enabling operation thereof.

4. The circuit of claim 3, wherein the degauss circuit further comprises a delay element connected with an output of the trigger circuit, the delay element operative to generate a delayed version of the trigger signal for presentation to the first and second signal generators and to the VCO.

5. A memory storage device for storing data, the memory storage device comprising:
    a magnetic medium;
    a write head, the write head operative to subject the magnetic medium to a magnetic field in response to the application of current to the write head;
    writing circuitry operative to apply a write current to the write head, the write current characterized by a current waveform that reverses polarity in accordance with the data to be stored; and
    degaussing circuitry operative to apply a degaussing current to the write head, the degaussing current characterized by a current waveform that oscillates between opposite polarities with an amplitude that changes over time and a frequency that changes over time, wherein as the amplitude changes, the frequency is also made to change.

6. The memory storage device of claim 5, wherein the write head comprises an inductive write head.

7. The memory storage device of claim 5, wherein the amplitude of the degaussing current decreases over time.

8. The memory storage device of claim 5, wherein the amplitude of the degaussing current decreases linearly over time.

9. The memory storage device of claim 5, wherein the amplitude of the degaussing current decreases non-linearly over time.

10. The memory storage device of claim 5, wherein the frequency of the degaussing current decreases over time.

11. The memory storage device of claim 5, wherein the frequency of the degaussing current decreases linearly over time.

12. The memory storage device of claim 5, wherein the frequency of the degaussing current decreases non-linearly over time.

13. The memory storage device of claim 5, wherein the frequency of the degaussing current increases over time.

14. The memory storage device of claim 5, wherein the frequency of the degaussing current increases linearly over time.

15. The memory storage device of claim 5, wherein the frequency of the degaussing current increases non-linearly over time.

16. The memory storage device of claim 5, wherein the degaussing current is formed at least in part by a voltage controlled oscillator.

17. The memory storage device of claim 16, wherein the voltage controlled oscillator is characterized by a square wave output with a frequency that changes over time.

18. A memory storage device for storing data, the memory storage device comprising:
   a magnetic medium;
   a write head, the write head operative to subject the magnetic medium to a magnetic field in response to the application of current to the write head;
   writing circuitry operative to apply a write current to the write head, the write current characterized by a current waveform that reverses polarity in accordance with the data to be stored; and
   degaussing circuitry operative to apply a degaussing current to the write head, the degaussing current characterized by a current waveform that oscillates between opposite polarities with an amplitude that changes over time and a frequency that changes over time;
   wherein the degaussing current is formed at least in part by a voltage controlled oscillator, and wherein an output of the voltage controlled oscillator is mixed with a voltage having an amplitude that changes over time to generate a square wave with an amplitude that changes over time.

19. A method for storing data on a magnetic storage device, the magnetic storage device including a magnetic medium and a write head operative to subject the magnetic medium to a magnetic field in response to an application of current to the write head, the method comprising the steps of:
   applying a write current to the write head, the write current characterized by a current waveform that reverses polarity in accordance with the data to be stored; and
   applying a degaussing current to the write head, the degaussing current characterized by a current waveform that oscillates between opposite polarities with an amplitude that changes over time and a frequency that changes over time, wherein as the amplitude changes, the frequency is also made to change.

20. Degaussing circuitry for degaussing a write head of a magnetic memory storage device, the degaussing circuitry being operative to apply a degaussing current to the write head, the degaussing current characterized by a current waveform that oscillates between opposite polarities with both an amplitude and a frequency that change over time, wherein as the amplitude changes the frequency is also made to change.

* * * * *